United States Patent [19]

Throckmorton

[11] 4,096,322

[45] Jun. 20, 1978

[54] POLYMERIZATION OF BUTADIENE

[75] Inventor: Morford C. Throckmorton, Akron, Ohio

[73] Assignee: The Goodyear Tire & Rubber Company, Akron, Ohio

[21] Appl. No.: 535,637

[22] Filed: Dec. 23, 1974

[51] Int. Cl.$^2$ .......................... C08F 4/70; C08F 36/06
[52] U.S. Cl. ................................ 526/133; 252/429 R; 252/431 R; 252/431 C; 526/142; 526/340.4
[58] Field of Search ............. 252/429 B, 431, 429 R, 252/431 R, 431 C; 260/94.3; 526/133

[56] References Cited

U.S. PATENT DOCUMENTS

| | | | |
|---|---|---|---|
| 3,161,628 | 12/1964 | Dost et al. | 260/94.9 C |
| 3,432,517 | 3/1969 | Ueda et al. | 260/94.3 |
| 3,528,957 | 9/1970 | Throckmorton et al. | 260/94.3 |
| 3,567,702 | 3/1971 | Mori et al. | 260/94.3 |

FOREIGN PATENT DOCUMENTS 4,013,072   6/1965   Japan.

*Primary Examiner*—Edward J. Smith
*Attorney, Agent, or Firm*—J. Y. Clowney

[57] ABSTRACT

A process for producing cis-1,4-polybutadiene by contacting butadiene with a catalyst consisting of (1) at least one organoaluminum compound, (2) at least one organonickel compound selected from the class consisting of nickel salts of carboxylic acids, organic complex compounds of nickel and nickel tetracarbonyl, (3) boron trifluoride gas or a boron trifluoride etherate complex, and (4) at least one alkyl substituted hydroxy containing aromatic compound wherein the alkyl groups leave the hydroxy groups unhindered for chemical activity in that no alkyl groups are present simultaneously on both positions ortho to the hydroxy groups.

7 Claims, No Drawings

POLYMERIZATION OF BUTADIENE

This invention is directed to a method of polymerization of butadiene to form polymers with a high, i.e. at least 90 percent, cis-1,4-microstructure. It is also directed to improved catalyst systems useful for this purpose. Such polymers have been found to possess properties which make them useful as synthetic rubbers.

It is an object of this invention to provide a method whereby butadiene can be polymerized to form polybutadiene by the use of an improved catalyst system. Another object is to prepare a polybutadiene having a higher molecular weight being produced at a faster polymerization rate. Other objects will become apparent as the description proceeds.

According to the invention, butadiene is polymerized under solution polymerization conditions with an improved catalyst comprising (a) at least one organoaluminum compound, (b) at least one organonickel compound selected from the group consisting of nickel salts of carboxylic acids, organic complex compounds of nickel and nickel tetracarbonyl, (c) boron trifluoride gas or a boron trifluoride etherate complex and (d) at least one alkyl substituted hydroxy containing aromatic compound wherein the alkyl groups leave the hydroxy groups unhindered for chemical activity in that no alkyl groups are present simultaneously on both positions ortho to the hydroxy groups.

By the term "organoaluminum compound" is meant any organoaluminum compound responding to the formula:

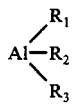

in which $R_1$ is selected from the group consisting of alkyl (including cycloalkyl), aryl, alkaryl, arylalkyl, alkoxy, hydrogen and fluorine, $R_2$ and $R_3$ being selected from the group of alkyl (including cycloalkyl), aryl, alkaryl, and arylalkyl. Representative of the compounds responding to the formula set forth above are: diethyl aluminum fluoride, di-n-propyl aluminum fluoride, diisobutyl aluminum fluoride and dihexyl aluminum fluoride. Also included are diethyl aluminum hydride, di-n-propyl aluminum hydride, diisobutyl aluminum hydride, diphenyl aluminum hydride, p-tolyl n-propyl aluminum hydride, benzyl ethyl aluminum hydride, and benzyl isopropyl aluminum hydride and other organoaluminum hydrides. Also diethylaluminum ethoxide, diisobutylaluminum ethoxide, and dipropylaluminum methoxide. Also included are trimethyl aluminum, triethyl aluminum, tri-n-propyl aluminum, triisopropyl aluminum, tri-n-butyl aluminum, triisobutyl aluminum, trihexyl aluminum, tricyclohexyl aluminum, trioctyl aluminum, triphenyl aluminum, tribenzyl aluminum, ethyl dibenzyl aluminum, diethyl p-tolyl aluminum, diethylbenzyl aluminum and other triorganoaluminum compounds. Also, by the term "organoaluminum compounds" is meant any compound responding to the formula R'R"$_3$ LiAl where R' and R" may be alkyl, alkaryl, or arylalkyl groups. R' and R" may or may not be the same. Representative of these compounds are n-butyl-triisobutyl lithium aluminum, tetrabutyl-lithium aluminum, tetraisobutyl-lithium aluminum, butyl triethyl-lithium aluminum and styryl tri-normal propyl lithium aluminum. The preferred organoaluminum compounds are trialkylaluminums and dialkylaluminum hydrides.

The component of the catalyst of this invention which contains nickel may be any organonickel compound. It is preferred to employ a soluble compound of nickel. These soluble nickel compounds are normally compounds of nickel with a mono- or bi-dentate organic ligand containing up to 20 carbon atoms. "Ligand" is defined as an ion or molecule bound to and considered bonded to a metal atom or ion. Monodentate means having one position through which covalent or coordinate bonds with the metal may be formed; bi-dentate means having two positions through which covalent or coordinate bonds with the metal may be formed. By the term "soluble" is meant soluble in inert solvents. Thus, any salt or an organic acid containing from about 1 to 20 carbon atoms may be employed. Representative of organonickel compounds are nickel benzoate, nickel acetate, nickel naphthenate, nickel octanoate, bis(α-furyl dioxime) nickel, nickel palmitate, nickel stearate, nickel acetylacetonate, nickel salicylaldehyde, bis(cyclopentadiene) nickel, bis(salicylaldehyde) ethylene diimine nickel, cyclopentadienylnickel nitrosyl and nickel tetracarbonyl. The preferred component containing nickel is a nickel salt of a carboxylic acid or an organic complex compound of nickel.

The boron trifluoride catalyst component may be boron trifluoride gas or a boron trifluoride etherate complex. Representative of the boron trifluoride etherate complexes are the complexes of boron trifluoride with ethers selected from the group, diethyl ether, di-n-propyl ether, dibutyl ether, dihexyl ether, tetrahydrofuran and dioxane.

The fourth catalyst component is an alkyl substituted hydroxy containing aromatic compound wherein the alkyl groups leave the hydroxy groups unhindered for chemical activity in that no alkyl groups are present simultaneously on both positions ortho to the hydroxy groups. These catalyst components accelerate the butadiene polymerization rate and produce a higher molecular weight cis-1,4-polybutadiene.

The hydroxy containing aromatic compounds may be described by the following formulas:

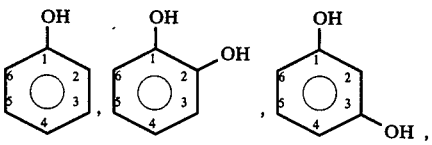

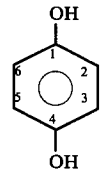

wherein carbon position number 6 is hydrogen and carbon positions 2, 3, 4 and 5 may be substituted with one or two alkyl groups having from one to six carbon atoms when not occupied by an OH group.

The hydroxy containing aromatic compound may also be described by the formula:

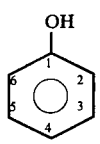

wherein the 2, 3 or 4 carbon atom positions may be substituted with an OH group and wherein the 2, 3 4 or 5 carbon atom positions may be substituted with one or two alkyl groups having from 1 to 6 carbon atoms when not substituted with OH and wherein the carbon position number 6 is always substituted with hydrogen.

Representative of the compounds described by the above formulas are 4-tertiary-butylcatechol, 3,5-ditertiarybutylcatechol, 4-methylcatechol, 5-hexylcatechol, 3-ethylcatechol, tertiary-butylhydroquinone, ethylhydroquinone, para-tertiary-butylphenol and metatertiarybutylphenol.

The catalyst components may be charged separately in either stepwise (in situ) or simultaneous addition to the polymerization system. The catalyst components also may be mixed together or "preformed" in the presence of catalytic amounts of conjugated diolefins such as 1,3-butadiene, isoprene, 1,3-pentadiene and the like. The order of addition of the catalyst components, and the temperature and length of reaction time all are important factors in preparing the preformed catalysts. It is preferred to have the catalytic amount of conjugated diolefin present before the organoaluminum compound and the nickel containing compound are mixed. It also generally is desirable to have the conjugated diolefin present before the organoaluminum and the boron trifluoride compound are mixed. As an example of one of several preferred orders for catalyst mixing, components may be added in the following order: (1) solvent, (2) conjugated diolefin, (3) hydroxy containing compound, (4) trialkylaluminum, (5) nickel compound, and (6) boron trifluoride compound.

The four component catalyst system has polymerization activity over a wide range of catalyst concentration and catalyst ratios. The four catalyst components interreact to form the active catalyst. As a result, the optimum concentration for any one component is very dependent upon the concentrations of each of the other two catalyst components. Furthermore, while polymerization will occur over a wide range of catalyst concentrations and ratios, polymers having the most desirable properties are obtained over a narrower range. Polymerization can occur while the mole ratio of the organoaluminum compound (Al) to the organonickel compound (Ni) ranges from about 0.3/1 to about 300/1; the mole ratio of boron trifluoride compound (BF$_3$) to the organonickel compound (Ni) ranges from about 0.5/1 to about 100/1 and the mole ratio of the boron trifluoride compound to the organoaluminum compound (Al) ranges from about 0.3/1 to about 10/1; the mole ratio of the hydroxy containing compound (OH) to the organoaluminum can range between about 0.01/1 to about 2/1 while the mole ratio of the catalytic amount of conjugated diolefin (CD) to the organonickel compound can range between about 1/1 to about 3000/1. However, the preferred mole ratios of Al/Ni range from about 2/1 to about 80/1, the preferred mole ratios of BF$_3$/Ni range from about 1/1 to about 50/1, the preferred mole ratios of BF$_3$/Al range from about 0.2/1 to about 5/1, the preferred mole ratios of OH/Al range from about 0.03/1 to about 1/1, and the preferred mole ratios of CD/Ni range from about 4/1 to about 1000/1.

The concentration of the catalyst employed depends on factors such as purity, rate desired, temperature and other factors, therefore, specific concentrations cannot be set forth except to say that catalytic amounts are used. Some specific concentrations and ratios which produce elastomers having desirable properties will be illustrated in the examples given herein to explain the teachings of this invention.

In general, the polymerizations of this invention are carried out in any inert solvent, and are, thus, solution polymerizations. By the term "inert solvent" is meant that the solvent or diluent does not enter into the structure of the resulting polymer nor does it adversely affect the properties of the resulting polymer nor does it have any adverse effect on the activity of the catalyst employed.

It has been discovered that the organic compounds containing the hydroxy substituents affect the polymerization rate and molecular weight in such a manner that is totally unexpected. When the inventive compounds of the instant invention are added to the catalyst system whether in situ or in a preformed manner the result is a faster polymerization rate as well as a higher molecular weight polybutadiene. Preferred solvents are hexane and benzene. The solvent/monomer volume ratio may be varied over a wide range. Up to 20 or more to one volume ratio of solvent to monomer can be employed. It is usually preferred or more convenient to use a solvent/monomer volume ratio of about 3/1 to about 6/1. Suspension polymerization may be carried out by using a solvent, e.g., butane or pentane, in which the polymer formed is insoluble. It should be understood, however, that it is not intended to exclude bulk polymerizations from the scope of this application.

It is usually desirable to conduct the polymerizations of this invention employing air-free and moisturefree techniques.

The temperatures employed in the polymerizations of this invention are not critical and may vary from a very low temperature such as −10° C. or below up to high temperatures such as 100° C. or higher. However, it is usually more desirable to employ a more convenient temperature between about 30° and about 90° C.

The practice of this invention is further illustrated by reference to the following examples which are intended to be representative rather than restrictive of the scope of this invention. Unless otherwise noted, all parts and percentages are by weight. Dilute solution viscosities (DSV) have been determined in toluene at 30° C.

EXAMPLE I

A purified butadiene (BD) in benzene premix containing 10 grams (gm) of butadiene per hundred milliliters (mls) of solution was charged to a number of dry four-ounce bottles. Each four-ounce bottle contained 100 mls. of premix. "In situ" addition of the catalyst components was made to each bottle of premix, charging catalysts in the order (1) triethylaluminum (TEAL), (2) nickel octanoate (NiOct), (3) boron trifluoride diethyletherate (BF$_3$.Et$_2$O) and (4) 4-tertiary-butylcatechol (tBC).

The polymerizations were carried out by tumbling the sealed bottles in a water bath at 50° C. The polymerizations were stopped after two hours by the addition of a shortstopping agent. The polymers were dried to a constant weight under a vacuum. The results are summarized in Table 1. Column 1 is the experiment number, columns 2 through 5 are catalyst components in millimoles per hundred grams of monomer (mhm), column 6 is polymer yield in weight percent and column 7 is dilute solution viscosity (DSV) in deciliters per gram. Experiment No. 1 is a control experiment; the presence of catalytic amounts of tBC in Experiments Nos. 3, 4 and 5 resulted in polymer yields which were approximately 50 percent greater than that produced in the control experiment.

Table 1

| Exp. No. | Catalyst, mhm. | | | | Polymer Yield, Wt.% | DSV |
|---|---|---|---|---|---|---|
| | TEAL | NiOct | BF$_3$ . Et$_2$O | tBC | | |
| 1 | 1.0 | 0.05 | 0.9 | 0 | 58 | 2.05 |
| 2 | " | " | " | 0.05 | 66 | 2.28 |
| 3 | " | " | " | 0.20 | 82 | 2.37 |
| 4 | " | " | " | 0.50 | 89 | 2.21 |
| 5 | " | " | " | 1.0 | 88 | 3.61 |
| 6 | " | " | " | 3.0 | 17 | ND[a] |

[a]ND - not determined.

EXAMPLE II

The experimental procedure was the same as that utilized in Example I, except that hexane was used as the solvent, the catalyst levels were those listed in Table 2 and the polymerizations were stopped after 30 minutes. The results are summarized in Table 2.

Table 2

| Exp. No. | Catalyst, mhm. | | | | Polymer Yield | DSV |
|---|---|---|---|---|---|---|
| | TEAL | NiOct | BF$_3$ . Et$_2$O | tBC | | |
| 1 | 0.8 | 0.075 | 1.8 | 0 | 62 | 3.12 |
| 2 | " | " | " | .05 | 66 | ND |
| 3 | " | " | " | .20 | 75 | 2.92 |
| 4 | " | " | " | .50 | 79 | 3.07 |
| 5 | " | " | " | 1.0 | 65 | 2.34 |
| 6 | " | " | " | 2.0 | 33 | ND |

EXAMPLE III

The experimental procedure was similar to that utilized in Example I except that a catalyst preformed in the presence of butadiene was employed in the present experiment. The preformed catalyst components were added at about 25° C. in the order (1) butadiene in benzene solution, (2) TEAL, (3) NiOct and (4) Bf$_3$.Et$_2$O and then aged for 15 minutes at room temperature (25° C.). Aliquots of the preformed catalyst were charged into bottles containing the butadiene in benzene premix as described in Example I. Then the incremental amounts of tBC listed in column 6, Table 3, were added in situ in Experiments Nos. 2 through 5. The polymerizations were conducted as in Example I except that they were stopped after one hour. The data is summarized in Table 3.

Table 3

| Exp. No. | Catalyst, mhm. (Preformed) | | | | In Situ tBC | Polymer Yield | DSV |
|---|---|---|---|---|---|---|---|
| | BD | TEAL | NiOct | BF$_3$ . Et$_2$O | | | |
| 1 | 5 | 1 | .05 | .9 | 0 | 70 | 2.10 |
| 2 | " | " | " | " | .05 | 75 | 2.40 |
| 3 | " | " | " | " | .20 | 81 | 3.17 |
| 4 | " | " | " | " | .50 | 64 | 4.83 |
| 5 | " | " | " | " | 1.0 | 10 | ND |

EXAMPLE IV

The experimental procedure was similar to that utilized in Example III except that part of the tBC was preformed with the other catalyst components and a final increment in situ was added. The order of addition in making the preformed catalyst was (1) hexane, (2) butadiene, (3) tBC, (4) TEAL, (5) nickel naphthenate (NiNaph) and (6) BF$_3$.Et$_2$O, then aging for one-half hour at room temperature. The data is summarized in Table 4.

Table 4

| Exp. No. | Catalyst, mhm. (Preformed) | | | | | In Situ tBC | Polymer Yield | DSV |
|---|---|---|---|---|---|---|---|---|
| | BD | TEAL | NiOct | BF$_3$ . Et$_2$O | tBC | | | |
| 1 | 3.75 | 0.8 | 0.075 | 1.8 | 0.018 | 0 | 78 | 3.03 |
| 2 | " | " | " | " | " | 0.05 | 78 | ND |
| 3 | " | " | " | " | " | 0.20 | 71 | 2.61 |
| 4 | " | " | " | " | " | 0.50 | 64 | 2.32 |
| 5 | " | " | " | " | " | 1.0 | 32 | ND |

EXAMPLE V

The procedure used in this example is similar to that used in Example I except that the hydroxy containing compound is para-tertiary-butylphenol (tBP). The polymerizations were conducted in benzene at 50° C. for one hour. Data is summarized in Table 5.

Table 5

| Exp. No. | Catalyst, mhm | | | | Yield Wt. % | DSV dl/gm |
|---|---|---|---|---|---|---|
| | TEAL | NiOct | BF$_3$ . Et$_2$O | tBP | | |
| 1 | 1 | .05 | .85 | 0 | 58 | 2.21 |
| 2 | " | " | " | .2 | 63 | ND[1] |
| 3 | " | " | " | .5 | 66 | ND |
| 4 | " | " | " | 1.0 | 82 | 2.65 |
| 5 | " | " | " | 1.5 | 81[a] | 2.81 |
| 6 | " | " | " | 2.0 | 81 | ND |
| 7 | " | " | " | 3.0 | 78 | ND |

[a]-The microstructure of the polymer prepared in Exp. No. 5 as determined by infrared analysis was 96.9 percent cis-1,4-, 1.4 percent trans-1,4- and 1.7 percent 1,2-polybutadiene.
[1]-Not Determined.

EXAMPLE VI

The procedure used in this example is similar to that utilized in Example I except that the hydroxy containing compound is 3,5-ditertiary-butylcatechol (3,5-tBC). The polymerizations were run in hexane at 50° C. for 30 minutes. The catalyst was prepared in situ. The data is summarized in Table 6.

Table 6

| Exp. No. | Catalyst, mhm | | | | Yield Wt. % | DSV dl/gm. |
|---|---|---|---|---|---|---|
| | TEAL | NiOct | BF$_3$ . Et$_2$O | 3,5-tBC | | |
| 1 | 0.9 | .05 | 1.8 | 0 | 73 | 3.15 |
| 2 | " | " | " | 0.2 | 74 | 3.28 |
| 3 | " | " | " | 0.5 | 79 | 3.26 |
| 4 | " | " | " | 1.0 | 69 | 2.70 |

While certain representative embodiments and details have been shown for the purpose of illustrating the invention, it will be apparent to those skilled in this art that various changes and modifications may be made therein without departing from the spirit or scope of the invention.

What is claimed is:

1. The process for the polymerization of butadiene to form polybutadiene containing a high proportion of butadiene units in the cis-1,4 configuration comprising contacting butadiene with a catalyst consisting essentially of (1) at least one organoaluminum compound, (2) at least one organonickel compound selected from the group consisting of nickel salts of carboxylic acids, organic complex compounds of nickel and nickel tetracarbonyl, (3) a boron trifluoride etherate, and (4) at least one alkyl substituted hydroxy containing aromatic compound wherein the alkyl groups leave the hydroxy groups unhindered for chemical activity in that no alkyl groups are present simultaneously on both positions ortho to the hydroxy groups and in which the mole ratio of component (1) to component (2) ranges from about 0.3/1 to about 300/1, the mole ratio of component (3) to component (2) ranges from about 0.5/1 to about 100/1, the mole ratio of component (3) to component (1) ranges from about 0.3/1 to about 10/1 and the mole ratio of component (4) to component (1) ranges from about 0.01/1 to about 2/1.

2. The process according to claim 1 in which the mole ratio of (Al/Ni) ranges from about 2/1 to about 80/1, the mole ratio of $BF_3$/Ni ranges from about 1/1 to about 50/1, the mole ratio of $BF_3$/Al ranges from about 0.2 to about 5/1 and the mole ratio of OH/Al ranges from about .03/1 to about 1/1.

3. The process according to claim 1 in which the hydroxy containing aromatic compound is selected from the group consisting of 4-tertiary butylcatechol, 3,5-ditertiary butylcatechol, 4-methylcatechol, 5-hexylcatechol, 3-ethylcatechol, tertiary, butylhydroquinone, ethylhydroquinone, para-tertiary-butylphenol, and meta tertiary butylphenol.

4. The process according to claim 1 in which the hydroxy containing compound is selected from the group consisting of 4-tertiary-butylcatechol, and para-t-butylphenol.

5. A process according to claim 1 in which (1) the organoaluminum compound is selected from the group consisting of a trialkylaluminum and a dialkylaluminum hydride, (2) the organonickel compound is a nickel salt of carboxylic acid, and (3) the alkyl substituted hydroxy containing compound is selected from the group consisting of 4-tertiary-butylcatechol, and para-tertiary butylphenol and 6. A catalytic composition consisting of (1) at least one organoaluminum compound, (2) at least one organonickel compound selected from the group consisting of nickel salts of carboxylic acids, organic complex compounds of nickel and nickel tetracarbonyl, (3) a boron trifluoride etherate, and (4) at least one alkyl substituted hydroxy containing aromatic compound wherein the alkyl groups leave the hydroxy groups unhindered for chemical activity in that no alkyl groups are present simultaneously on both positions ortho to the hydroxy groups.

7. A catalytic composition according to claim 6 wherein (1) the organoaluminum compound is a trialkylaluminum, (2) the organonickel compound is a nickel salt of a carboxylic acid, and (3) the hydroxy containing compound is selected from the group consisting of 4-tertiary-butylcatechol, and para-tertiary-butylphenol.

* * * * *